US009886367B2

(12) United States Patent
Fine

(10) Patent No.: US 9,886,367 B2
(45) Date of Patent: Feb. 6, 2018

(54) UNIFIED PROCESSING TEST STRUCTURE

(71) Applicant: International Business Machines Corporation, Armonk, NY (US)

(72) Inventor: Richard L. Fine, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/699,193

(22) Filed: Apr. 29, 2015

(65) Prior Publication Data
US 2016/0321164 A1 Nov. 3, 2016

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
CPC .............. G06F 11/3664–11/3696; G06F 9/44–9/44594; G06F 9/54–9/548
See application file for complete search history.

(56) References Cited

U.S. PATENT DOCUMENTS

| | | | | |
|---|---|---|---|---|
| 5,812,846 A * | 9/1998 | Dowedeit | ............... | G06F 9/543 710/5 |
| 6,002,871 A * | 12/1999 | Duggan | .............. | G06F 11/3664 714/38.12 |
| 7,853,926 B2 * | 12/2010 | Blouin | .................. | G06F 11/263 709/221 |
| 8,365,147 B2 | 1/2013 | Grechanik et al. | | |
| 8,572,591 B2 * | 10/2013 | Cwalina | .................. | G06F 8/447 717/147 |
| 8,707,265 B2 | 4/2014 | Li | | |
| 8,776,096 B2 * | 7/2014 | Bockus | ............... | G06F 9/45537 709/206 |
| 8,813,035 B2 | 8/2014 | Mathew et al. | | |

(Continued)

FOREIGN PATENT DOCUMENTS

WO 2014088398 A1 6/2014

OTHER PUBLICATIONS

"A Method and Apparatus to Run the Test Cases in Parallel"; ip.com; IP.com No. 000216935; p. 1-5; Apr. 25, 2012.

(Continued)

*Primary Examiner* — Todd Aguilera
(74) *Attorney, Agent, or Firm* — Cantor Colburn LLP; William A. Kinnaman, Jr.

(57) ABSTRACT

A method, comprises receiving a test case on a processor, receiving an input from a user to call the test case in a first calling environment, identifying the first calling environment, setting a first indicator in a memory indicating the first calling environment, running a directive in the test case, wherein the directive calls a subroutine associated with the directive, and running the subroutine called by the directive wherein the subroutine includes receiving the first indicator indicating the first calling environment, performing a first task associated with the directive wherein the first task is performed in the first calling environment responsive to receiving the first indicator indicating the first calling environment, and outputting a result of the first task to a user on a display.

11 Claims, 4 Drawing Sheets

(56) References Cited

U.S. PATENT DOCUMENTS

| | | | | |
|---|---|---|---|---|
| 8,843,894 | B2* | 9/2014 | Dawson | G06F 9/5027 717/124 |
| 8,892,947 | B1* | 11/2014 | Chopra | G06F 11/3688 714/32 |
| 9,047,404 | B1* | 6/2015 | Jibaly | G06F 11/362 |
| 2007/0168728 | A1* | 7/2007 | Blouin | G06F 11/263 714/25 |
| 2010/0319010 | A1* | 12/2010 | Bockus | G06F 9/45537 719/330 |
| 2011/0307869 | A1* | 12/2011 | Cwalina | G06F 8/447 717/127 |
| 2013/0235992 | A1* | 9/2013 | Dawson | G06F 9/5027 379/201.02 |
| 2014/0089895 | A1 | 3/2014 | Clee et al. | |
| 2014/0109055 | A1 | 4/2014 | Gibbens et al. | |
| 2015/0100829 | A1* | 4/2015 | Nanjundappa | G06F 11/0748 714/38.1 |
| 2016/0321168 | A1* | 11/2016 | Fine | G06F 11/3688 |

OTHER PUBLICATIONS

Cadar, Cristian, et al.; "Klee: Unassisted and Automatic Generation of High-Coverage Tests for Complex Systems Programs"; retreived on the internet on Apr. 27, 2015 from https://www.usenix.org/legacy/events/osdi08/tech/full_papers/cadar/cadar_html/; p. 1-30; 2008.

Fine et al., Pending U.S. Appl. No. 15/072,742; entitled: "Unified Processing Test Structure"; filed Mar. 17, 2016.

List of IBM Patents or Patent Applications Treated as Related; (Appendix P), Filed Oct. 27, 2016; 2 pages.

* cited by examiner

UNIFIED PROCESSING TEST STRUCTURE

BACKGROUND

The present invention relates to testing software, and more specifically, to running test cases in multiple user interfaces.

In large scale computing systems such as mainframe systems, users often use software to control and view portions of the operation and resources of the system. Scheduling of jobs and workload, batch job outputs, and log files are often monitored and controlled by a user using software.

The software developer often runs a variety of test routines to ensure that the software operates as designed. The testing process can be time consuming and cumbersome.

SUMMARY

According to one embodiment of the present invention, a method comprises receiving a test case on a processor, receiving an input from a user to call the test case in a first calling environment, identifying the first calling environment, setting a first indicator in a memory indicating the first calling environment, running a directive in the test case, wherein the directive calls a subroutine associated with the directive, and running the subroutine called by the directive wherein the subroutine includes receiving the first indicator indicating the first calling environment, performing a first task associated with the directive wherein the first task is performed in the first calling environment responsive to receiving the first indicator indicating the first calling environment, and outputting a result of the first task to a user on a display.

According to another embodiment of the present invention, a system comprises memory, and a processor operative to receive a test case, receive an input from a user to call the test case in a first calling environment, identify the first calling environment, set a first indicator in the memory indicating the first calling environment, run a directive in the test case, wherein the directive calls a subroutine associated with the directive, and run the subroutine called by the directive wherein the subroutine includes receiving the first indicator indicating the first calling environment, performing a first task associated with the directive wherein the first task is performed in the first calling environment responsive to receiving the first indicator indicating the first calling environment, and output a result of the first task to a user on a display.

According to yet another embodiment of the present invention, a computer program product comprising a computer readable storage medium having program instructions embodied therewith, the program instructions executable by a processor to cause the processor to perform a method that comprises receiving a test case, receiving an input from a user to call the test case in a first calling environment, identifying the first calling environment, setting a first indicator in a memory indicating the first calling environment, running a directive in the test case, wherein the directive calls a subroutine associated with the directive, and running the subroutine called by the directive wherein the subroutine includes receiving the first indicator indicating the first calling environment, performing a first task associated with the directive wherein the first task is performed in the first calling environment responsive to receiving the first indicator indicating the first calling environment, and outputting a result of the first task to a user on a display.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
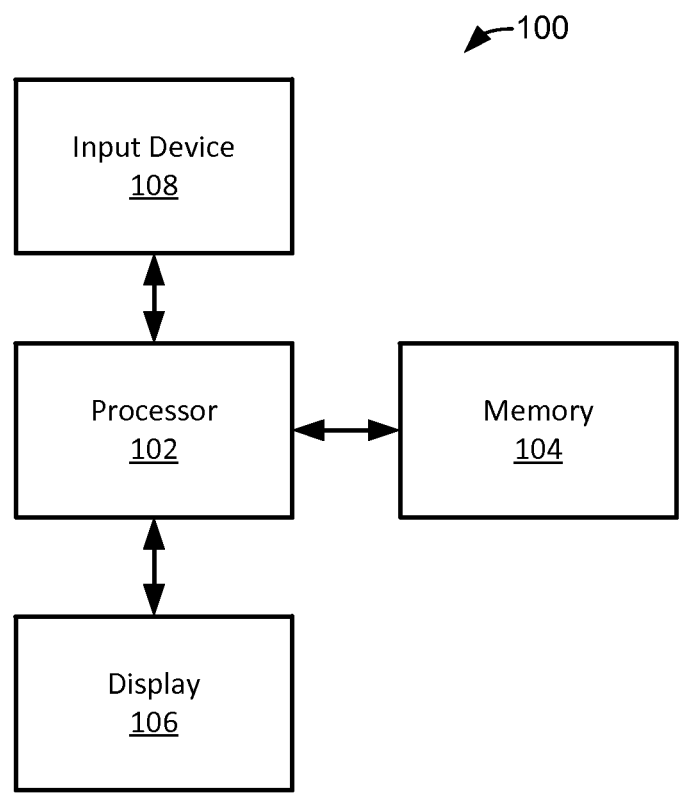
FIG. 1 illustrates a block diagram of an exemplary embodiment of a computer system.

System display and searching software used in mainframe computing systems may provide the user with an option of using different interfaces (environments) such as, for example, a batch interface that allows batch programs to interact with the software. An example of a batch interface is a restructured extended executor (REXX) language interface that allows a user to interact with the software by entering REXX commands. The software may also provide the user with an option to use an interactive or panel interface that may include, for example, a graphical user interface (GUI), a textual interface, or a menu operated user interface. A menu operated user interface provides menus for a user to enter commands via the interface menus.

When the software is tested, a developer runs test cases to ensure that the software is operating properly. An example of a test case may include searching for a particular processing job using the software and viewing the processing job. An end user may use either the batch interface or the panel interface to perform this task, thus the developer often runs the test case separately on each interface to ensure that the software is operating properly.

The developer often programs scripts for each test case. Thus, when testing software that has two or more environments, each test case must have a script written for each environment to perform the test case for each environment. For example, in a computing system that has system display and searching software with two environments, a batch environment and a panel environment, if the goal of a test case is to access and view a particular job that has been performed on a computing system, the developer often writes two scripts for the test case. Each script may include directives that direct the target software to perform particular operations. The first script would be written for running the test case in the batch environments and the second script would be written for running the test case in the panel environments. The function of first and second scripts are similar however, the actual directives written into the scripts correspond to the called environment of the first and second scripts. For example, a directive that would execute a task such as "set the owner of a job" may be scripted in the first script to execute a REXX statement (e.g., "isfowner=id")

while the similar directive in the second script may include the task of entering the owner id on a menu. Thus, different commands that are compatible with the calling environment are scripted for a similar particular directive in the first and second scripts that are called in the batch and interactive environments respectively. Writing multiple scripts per test case is laborious and is prone to user error.

In this regard, the embodiments described herein provide for software that has multiple user environments to be tested by using a unified test case script for each test case. The unified test case script enables a developer to write a script for a test case that may be sequentially run in each environment that is supported by the software.

FIG. 1 illustrates a block diagram of an exemplary embodiment of a processing system 100 that includes a processor 102 communicatively connected to a memory 104, a display 106, and an input device 108. The processor 102 may run the software that is being tested (target software) and test case scripts that are used to test the operation of the target software on the processor 102.

Figure 2:
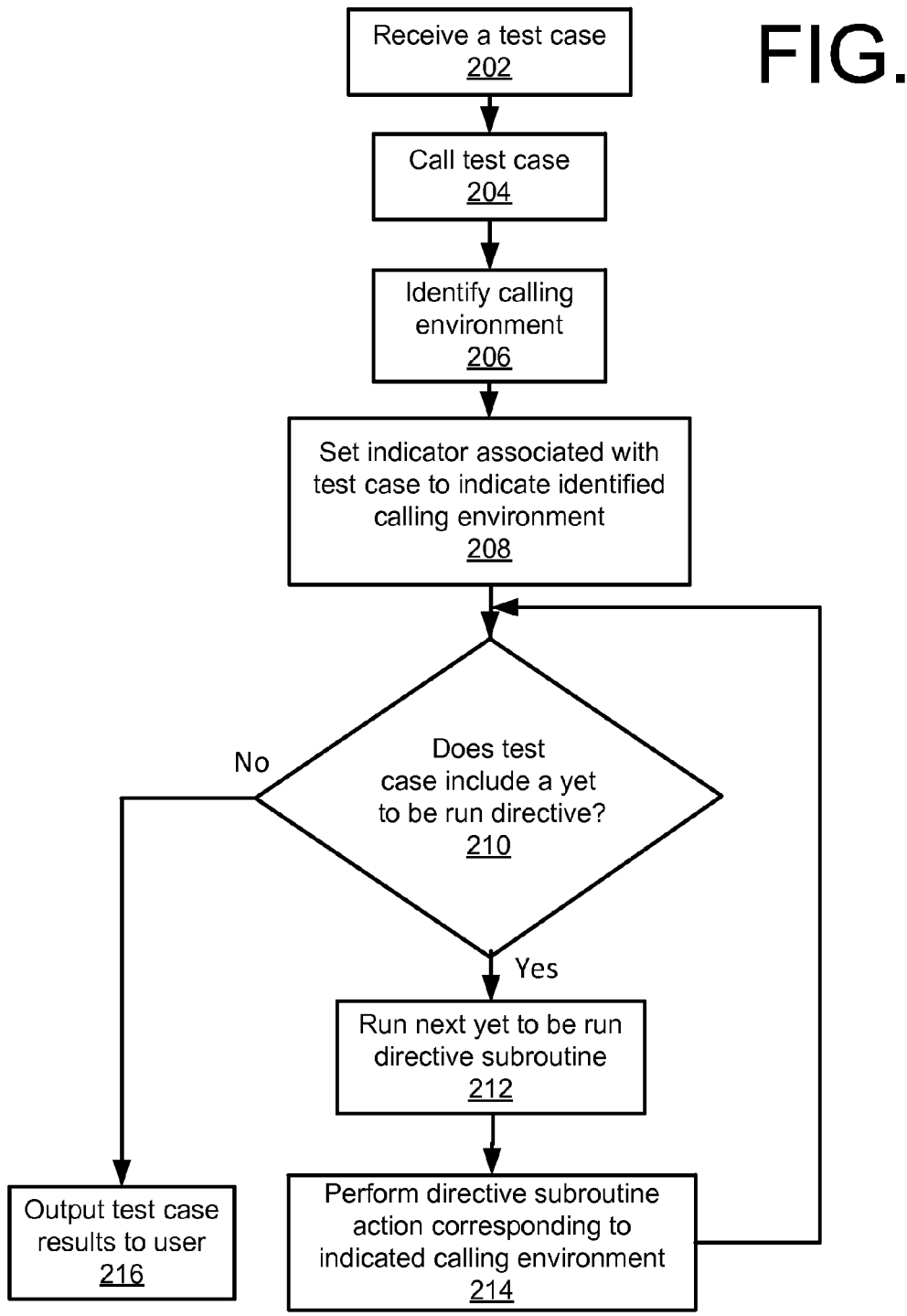
FIG. 2 illustrates a block diagram of a method for running test cases to test target software.

FIG. 2 illustrates a block diagram of a method for running test cases to test target software. Target software is software that is being tested by a user. In block 202 a test case that includes a testing script is received by the processor 102 (of FIG. 1). The test case may be called in block 204 by, for example, receiving an input from a user that calls the testing script. The user may call the test case and designate a particular interface environment. In the illustrated example, the target software may be operated in a batch environment (e.g., REXX) or a panel environment (e.g., GUI environment). In block 206, the processor 102 identifies the calling environment. In the illustrated embodiment, the processor 102 determines whether the calling environment is a batch environment or an interactive environment. In block 208, the processor 102 sets an indicator that is associated with the test case that corresponds to the identified calling environment. For example, a file associated with the called test case may include a numerical indicator or flag bit(s) that is set by the processor 102 to indicate the identified calling environment of the test case. The processor 102 determines if the test case script has any directives (unified directives) that have not been run. If yes, in block 212 the processor runs a directive subroutine that is called by the next yet to be run directive in the called test case.

In the illustrated embodiment, a directive subroutine is a subroutine that performs a directive in the test case in the identified calling environment. Thus, when a test case is written, a directive that calls a directive subroutine for the target software to perform a task may be included in the test case. As the test case runs, and the directive is encountered, the directive subroutine is called and performs the task in the identified (i.e., proper) calling environment.

Referring still to FIG. 2, in block 214, the directive subroutine action corresponding to the indicated calling environment is performed. Once the directive subroutine action is performed in block 214, the processor returns to block 210. In block 210, if the processor determines that the test case does not include any more yet to be run directives, the test case results are output to a user on the display 106 in block 216.

Figure 3:
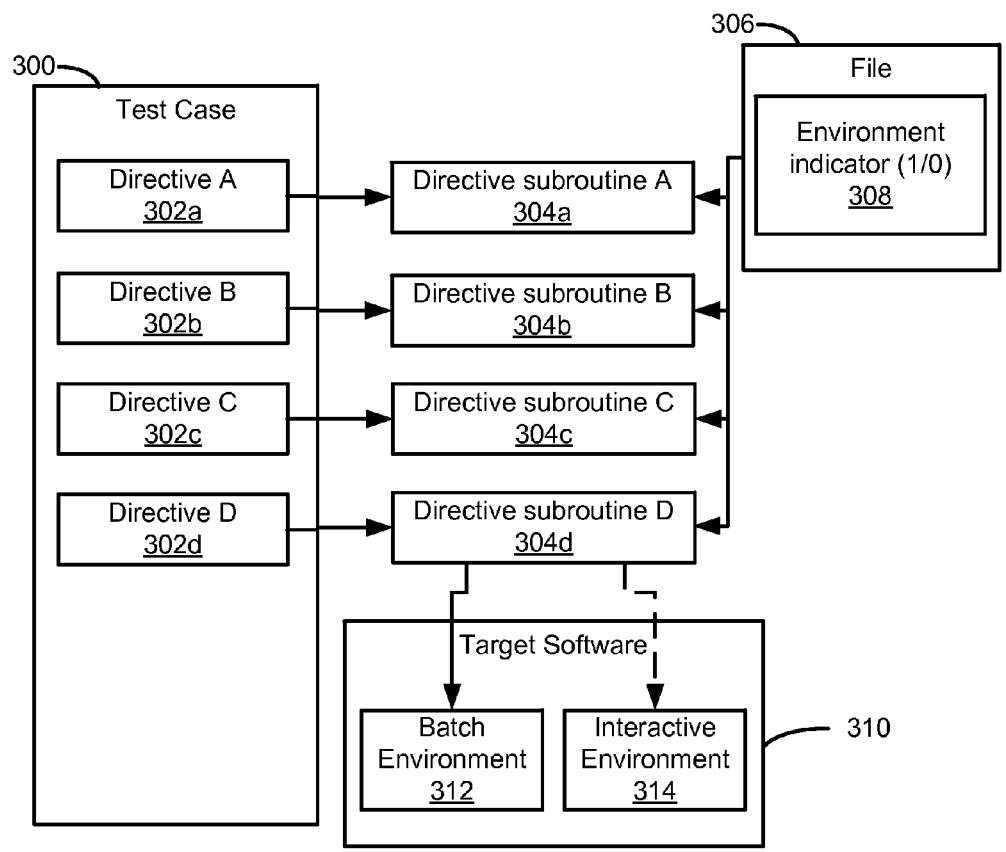
FIG. 3 illustrates a block diagram of an exemplary embodiment of a test case.

FIG. 3 illustrates a block diagram of an exemplary embodiment of a test case 300. The test case 300 includes directives A-D 302a-d. The test case 302 may include any number of directives. Each directive has an associated directive subroutine A-D 304a-d that is called by the corresponding directive. Each directive may have any number of associated directive subroutines, or no associated directive subroutines. The file 306 is stored in the memory 104 (of FIG. 1) and includes the environment indicator 308. The environment indicator 308 in the illustrated exemplary embodiment includes a "flag" with a 1 or 0 that indicates a batch environment or an interactive environment 314 respectively, however; any alternate indicator may be used including other numbers for target software with more than two environments. In the illustrated example, the directive subroutine D 304d is shown interacting with the batch environment 312 of the target software 310 responsive to determining that the environment indicator 308 indicates the batch environment 312 as the called environment. Alternatively, in another run of the test case 300, if the environment indicator 308 indicated that the interactive environment 314 is the called environment, the directive subroutine D 304d would interact with the interactive environment 314.

Figure 4:
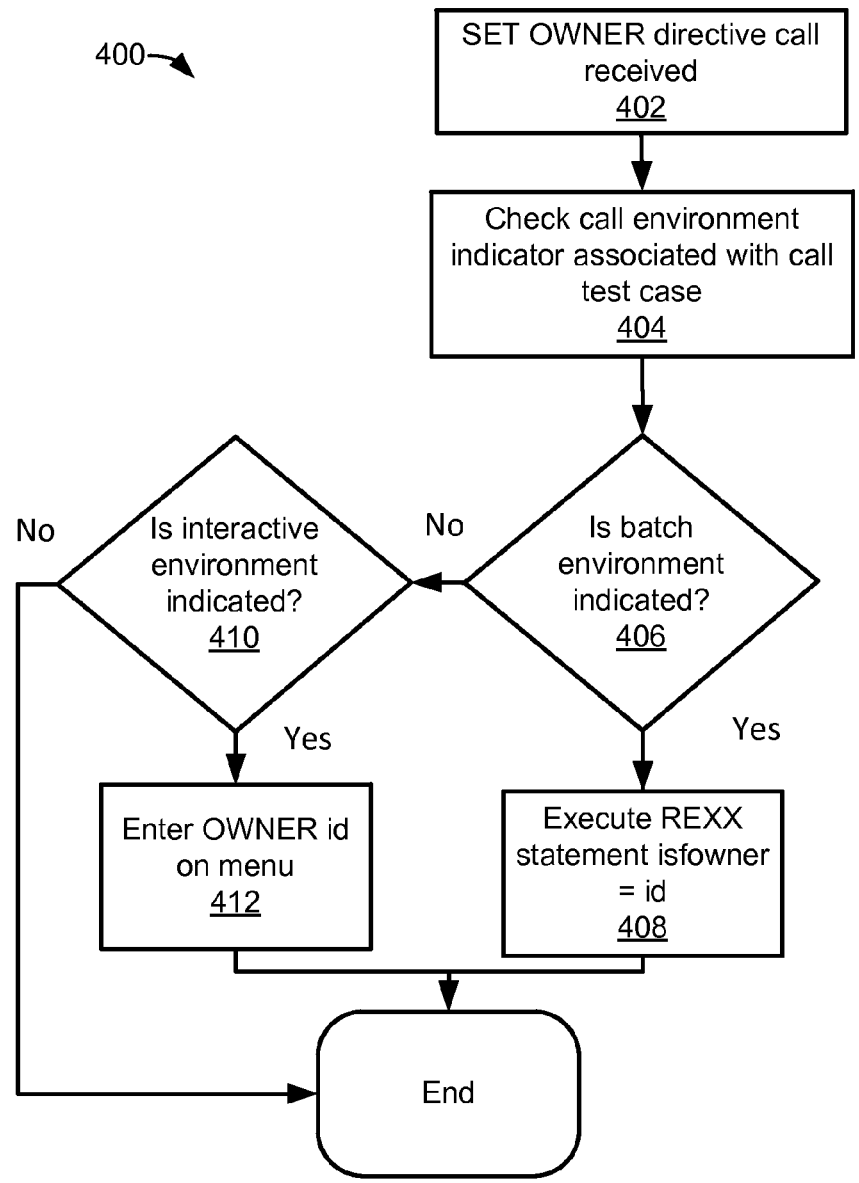
FIG. 4 illustrates block diagram of an exemplary embodiment of a directive subroutine.

FIG. 4 illustrates a block diagram of an exemplary embodiment of a directive subroutine 400. In this illustrated example, the directive subroutine is called by a "SET OWNER" directive in the test case script in block 402. In block 404, the processor 102 (of FIG. 1) checks the set call environment indicator that indicates the identified calling environment. The processor 102 determines in block 406 whether a batch environment is indicated by the call environment indicator. If yes, a REXX statement (e.g., "isfowner=id") is executed in the batch environment in block 408. If no, the processor 102 determines whether an interactive environment is indicated by the call environment indicator in block 410. If yes, the processor 102 enters the owner id on a menu in the interactive environment in block 412.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving a test case on a processor, wherein the test case corresponds to a unified test case script, the test case is configured to be run in both a first calling environment and a second calling environment, the first calling environment is a batch environment, the second calling environment is an interactive environment, the test case is configured to execute a REXX statement in the first calling environment, and the test case is configured to enter an entry on a menu in the second calling environment;

receiving an input from a user to call the test case in the first calling environment;

identifying the first calling environment;

setting a first indicator in a memory indicating the first calling environment;

running a directive in the test case, wherein the directive calls a subroutine associated with the directive;

running the subroutine called by the directive wherein the subroutine includes:

receiving from the memory, the first indicator indicating the first calling environment;

performing a first task associated with the directive wherein the first task is performed in the first calling environment responsive to receiving the first indicator indicating the first calling environment; and outputting a result of the first task to a user on a display;

receiving an input from a user to call the test case in the second calling environment;

identifying the second calling environment;

setting a second indicator in the memory indicating the second calling environment;

running the directive in the test case, wherein the directive calls the subroutine associated with the directive; and running the subroutine called by the directive wherein the subroutine further includes:

receiving from the memory the second indicator indicating the second calling environment; and performing a second task associated with the directive wherein the second task is performed in the second calling environment responsive to receiving the second indicator indicating the second calling environment, wherein the first task comprises executing the REXX statement in the first calling environment, and the second task comprises entering the entry on the menu in the second calling environment.

2. The method of claim 1, wherein the batch environment includes a restructured extended executor (REXX) language interface.

3. The method of claim 1, wherein the interactive environment includes a graphical user interface.

4. The method of claim 1, wherein the first task and a second task perform a same function that is associated with the directive.

5. A system, comprising:
a memory; and
a processor operative to:
receive a test case, wherein the test case corresponds to a unified test case script, the test case is configured to be run in both a first calling environment and a second calling environment, the first calling environment is a batch environment, the second calling environment is an interactive environment, the test case is configured to execute a REXX statement in the first calling environment, and the test case is configured to enter an entry on a menu in the second calling environment;

receive an input from a user to call the test case in the first calling environment;

identify the first calling environment;

set a first indicator in the memory indicating the first calling environment;

run a directive in the test case, wherein the directive calls a subroutine associated with the directive;

run the subroutine called by the directive wherein the subroutine includes:

receiving from the memory, the first indicator indicating the first calling environment;

performing a first task associated with the directive wherein the first task is performed in the first calling environment responsive to receiving the first indicator indicating the first calling environment; and output a result of the first task to a user on a display;

receive an input from a user to call the test case in the second calling environment;

identify the second calling environment;

set a second indicator in the memory indicating the second calling environment;

run the directive in the test case, wherein the directive calls the subroutine associated with the directive; and run the subroutine called by the directive wherein the subroutine further includes:

receiving from the memory, the second indicator indicating the second calling environment; and performing a second task associated with the directive wherein the second task is performed in the second calling environment responsive to receiving the second indicator indicating the second calling environment, wherein the first task comprises executing the REXX statement in the first calling environment, and the second task comprises entering the entry on the menu in the second calling environment.

6. The system of claim 5, wherein the batch environment includes a restructured extended executor (REXX) language interface.

7. The system of claim 5, wherein the interactive environment includes a graphical user interface.

8. The system of claim 5, wherein the first task and a second task perform a same function that is associated with the directive.

9. A computer program product comprising a computer readable storage medium having program instructions embodied therewith, the program instructions executable by a processor to cause the processor to perform a method comprising:

receiving a test case, wherein the test case corresponds to a unified test case script, the test case is configured to be run in both a first calling environment and a second calling environment, the first calling environment is a batch environment, the second calling environment is an interactive environment, the test case is configured to execute a REXX statement in the first calling environment, and the test case is configured to enter an entry on a menu in the second calling environment;

receiving an input from a user to call the test case in the first calling environment;

identifying the first calling environment;

setting a first indicator in a memory indicating the first calling environment;

running a directive in the test case, wherein the directive calls a subroutine associated with the directive;

running the subroutine called by the directive wherein the subroutine includes:

receiving from the memory, the first indicator indicating the first calling environment;

performing a first task associated with the directive wherein the first task is performed in the first calling environment responsive to receiving the first indicator indicating the first calling environment; and outputting a result of the first task to a user on a display;

receiving an input from a user to call the test case in the second calling environment;

identifying the second calling environment;

setting a second indicator in the memory indicating the second calling environment;

running the directive in the test case, wherein the directive calls the subroutine associated with the directive; and running the subroutine called by the directive wherein the subroutine further includes:

receiving from the memory, the second indicator indicating the second calling environment; and performing a second task associated with the directive wherein the second task is performed in the second calling environment responsive to receiving the second indicator indicating the second calling environment, wherein the first task comprises executing the REXX statement in the first calling environment, and the second task comprises entering the entry on the menu in the second calling environment.

10. The computer program product of claim 9, wherein the batch environment includes a restructured extended executor (REXX) language interface.

11. The computer program product of claim 9, wherein the interactive environment includes a graphical user interface.

* * * * *